United States Patent [19]

Lombard

[11] Patent Number: 5,402,607
[45] Date of Patent: Apr. 4, 1995

[54] METHOD AND MULTI-AXIS NUMERICALLY-CONTROLLED MACHINE FOR MACHINING SURFACES

[75] Inventor: Gérard Lombard, Tronville en Barrois, France

[73] Assignee: Essilor International (Compagnie Generale d'Optique), France

[21] Appl. No.: 945,231

[22] Filed: Sep. 14, 1992

[30] Foreign Application Priority Data

Sep. 20, 1991 [FR] France .................. 91 11602

[51] Int. Cl.$^6$ .............................................. B24B 49/00
[52] U.S. Cl. ........................................ 451/5; 451/11; 451/106; 451/28
[58] Field of Search ........... 51/165 R, 165.71, 165.77, 51/123 R, 123 G, 131.1, 95 R, 281 R, 103 R, 105 R, 95 WH, 165.8, 105 LG, 106 LG, 124 R, 124 L, 33 R, 47; 409/205

[56] References Cited

U.S. PATENT DOCUMENTS

| | | | |
|---|---|---|---|
| 1,959,269 | 5/1934 | Gorton | 90/14 |
| 3,232,141 | 2/1966 | Swanson | 77/31 |
| 3,657,961 | 4/1972 | Pasquale | 409/205 |
| 4,115,956 | 9/1978 | Huffman | 51/96 |
| 4,535,570 | 8/1985 | Ochiai et al. | 51/165.77 |
| 4,815,239 | 3/1989 | Sommer | 51/165.77 |
| 4,956,945 | 9/1990 | Ooshima | 51/165.77 |
| 4,984,351 | 1/1991 | Matsuyama et al. | 51/165.77 |
| 5,035,088 | 7/1991 | Putnam et al. | 51/123 R |
| 5,197,228 | 3/1993 | Sharkey, III et al. | 51/165.77 |

FOREIGN PATENT DOCUMENTS

| | | |
|---|---|---|
| 281754 | 9/1988 | European Pat. Off. . |
| 305735 | 3/1989 | European Pat. Off. . |
| 2365409 | 4/1978 | France . |
| 2612438 | 9/1988 | France . |
| 108483 | 2/1900 | Germany . |
| 0841112 | 6/1952 | Germany .................. 51/33 W |
| 2105578 | 3/1972 | Germany . |
| 1285914 | 8/1972 | United Kingdom . |

*Primary Examiner*—Maurina T. Rachuba

[57] ABSTRACT

In this machining method using a multi-axis numerically-controlled machine, a workpiece holder (4) is rotated (rotation α) in step-by-step motion around an axis (Z), rectilinear movements are produced between a tool (3) and the workpiece holder (4) respectively along axes (Z and X), and in addition the tool (3) is rotated (rotation β) around an axis (Y), these various movements being controlled in response to data corresponding to a required surface to be produced on a workpiece. The step-by-step rotating movement and the rectilinear movements are used for producing a spiral path of the tool on the surface of the workpiece to be machined, while the rotating movement (β) is used to achieve the required thickness removed at successive points on the spiral path.

9 Claims, 9 Drawing Sheets

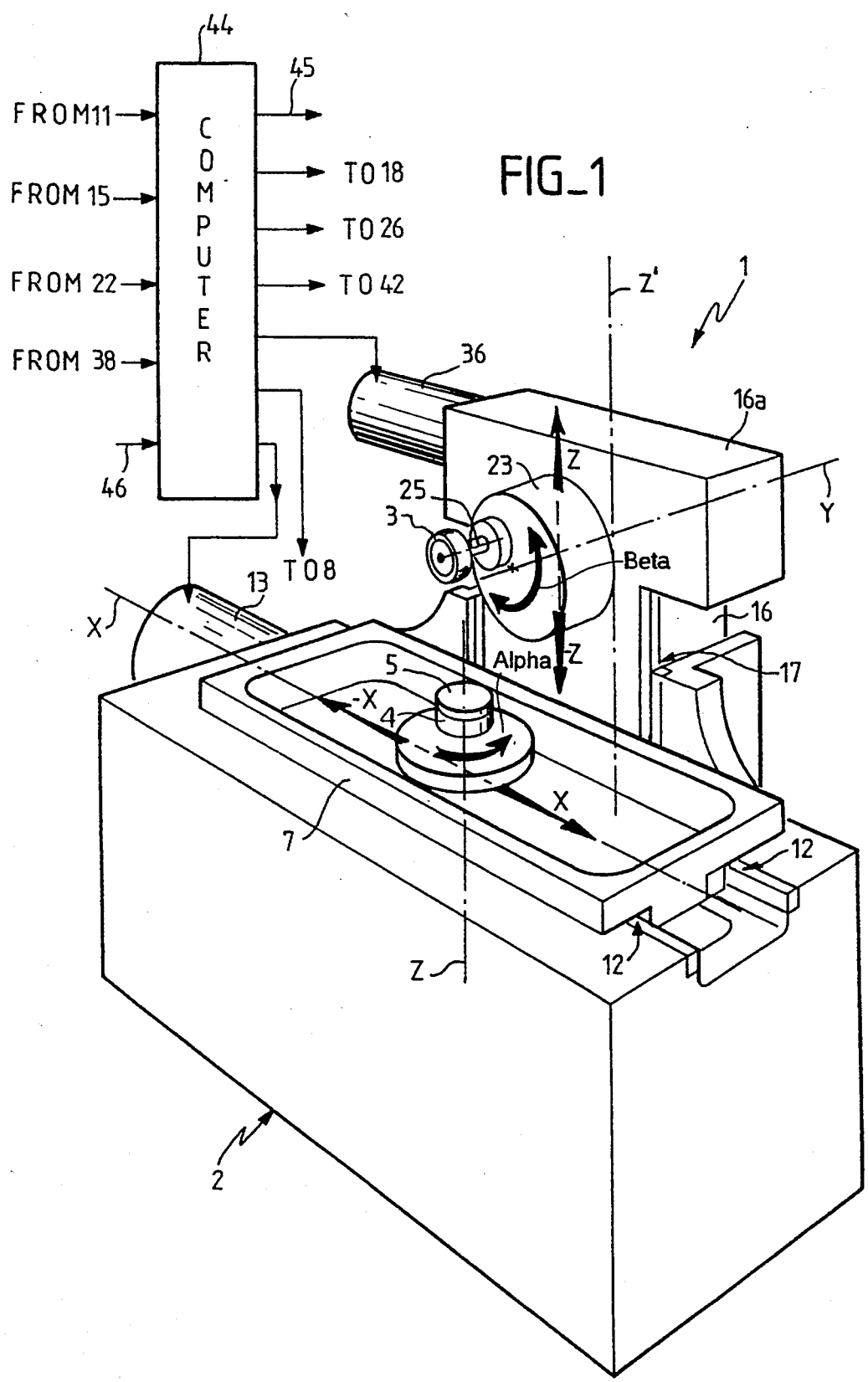
FIG_1

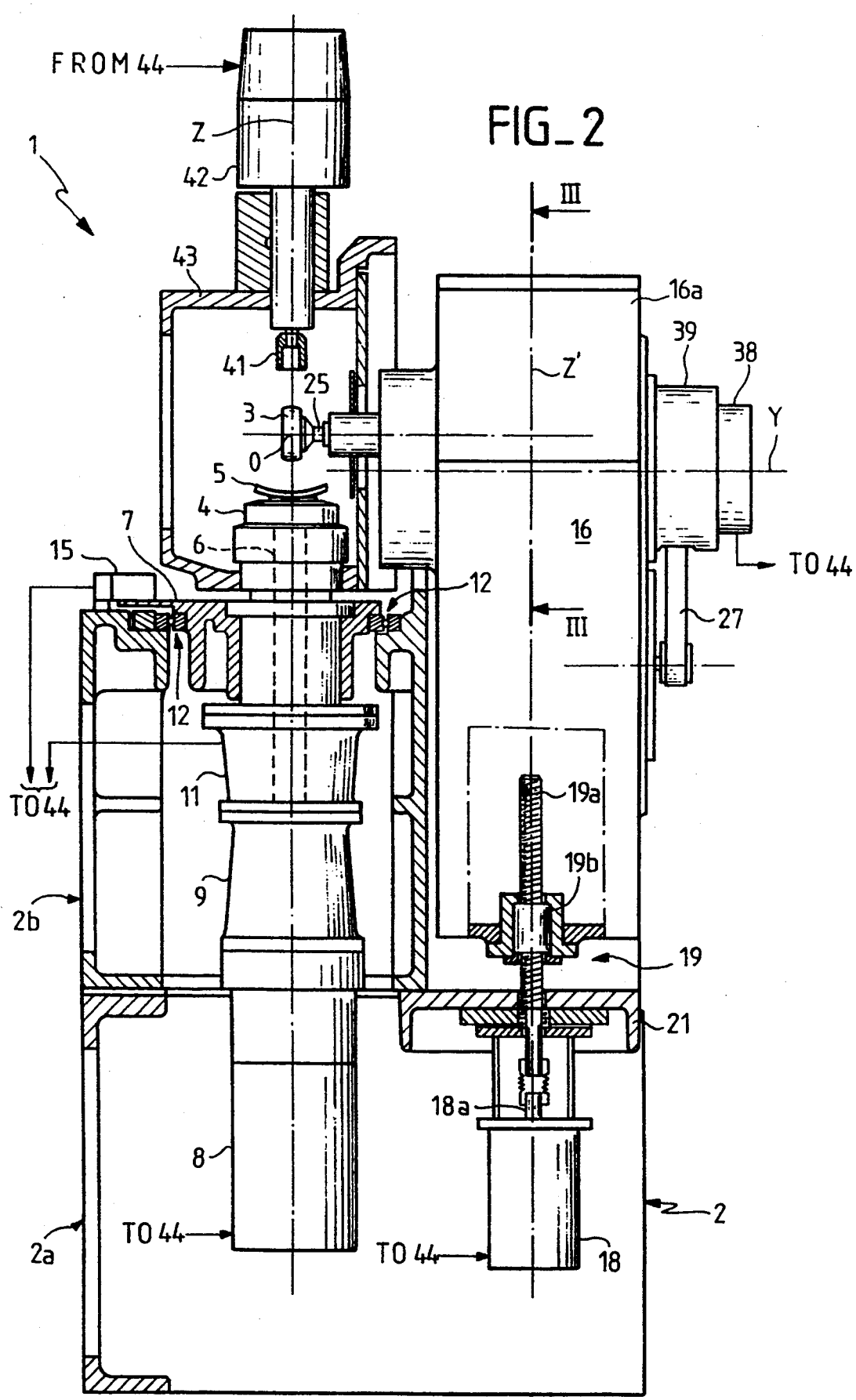

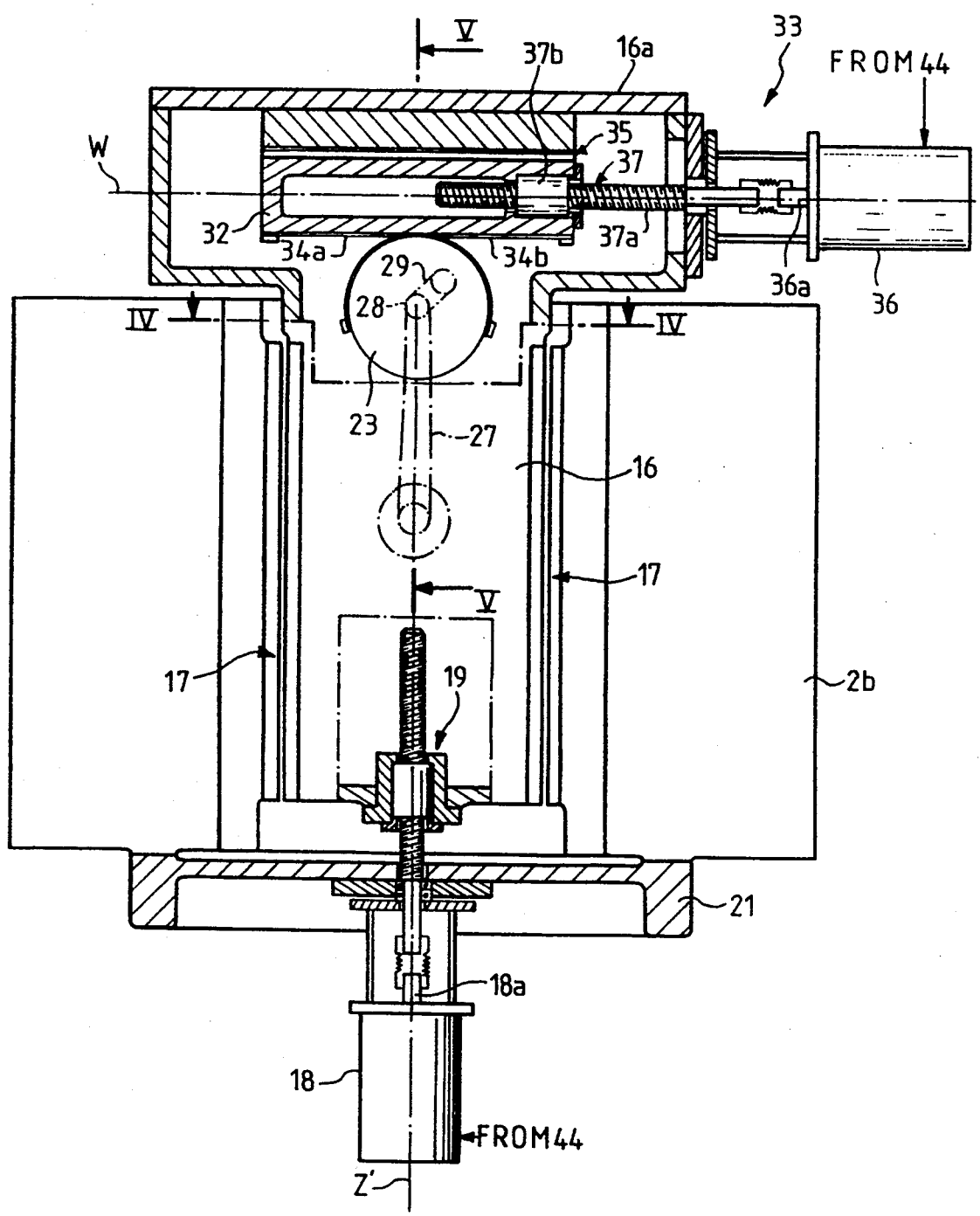
FIG_3

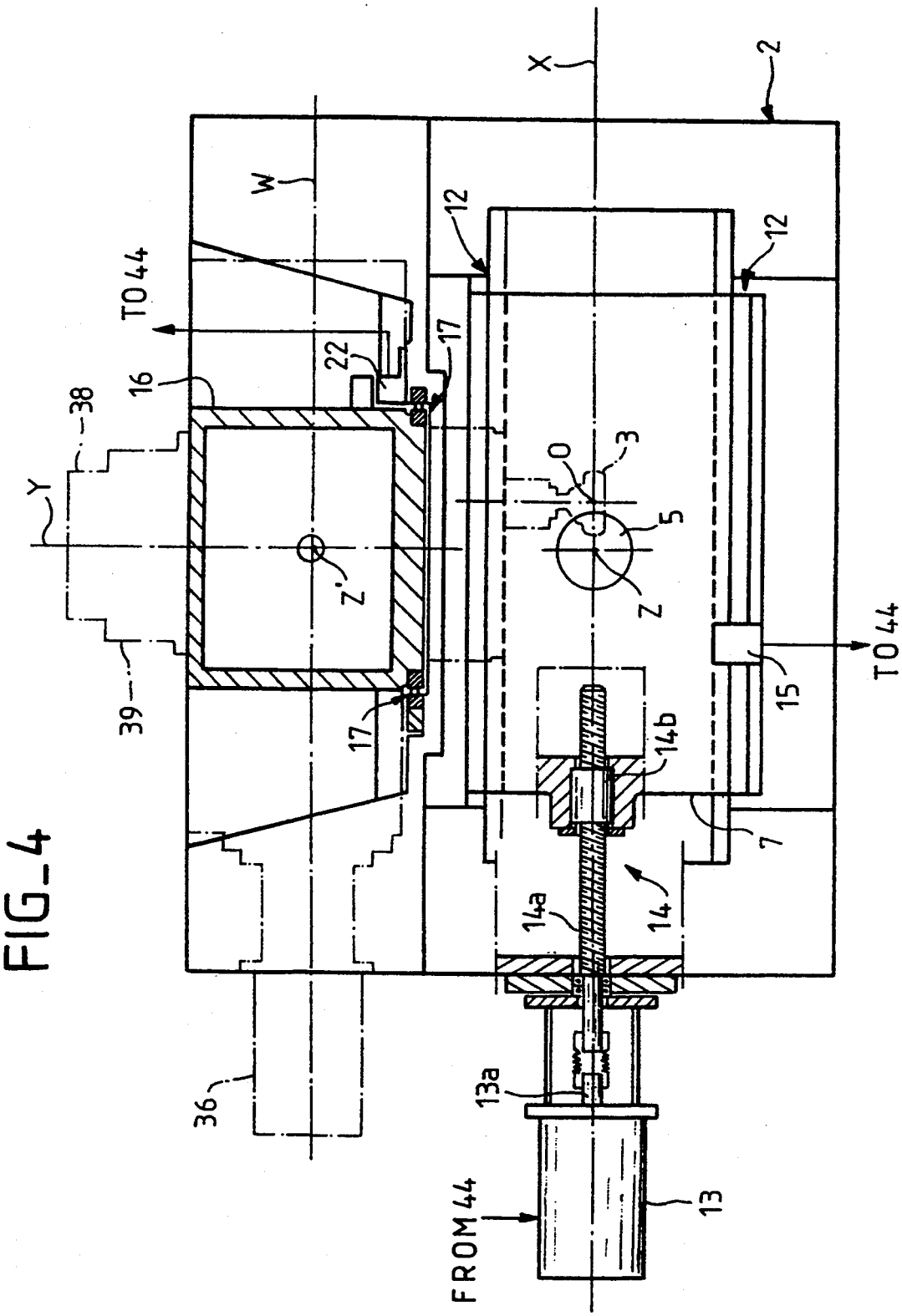
FIG_4

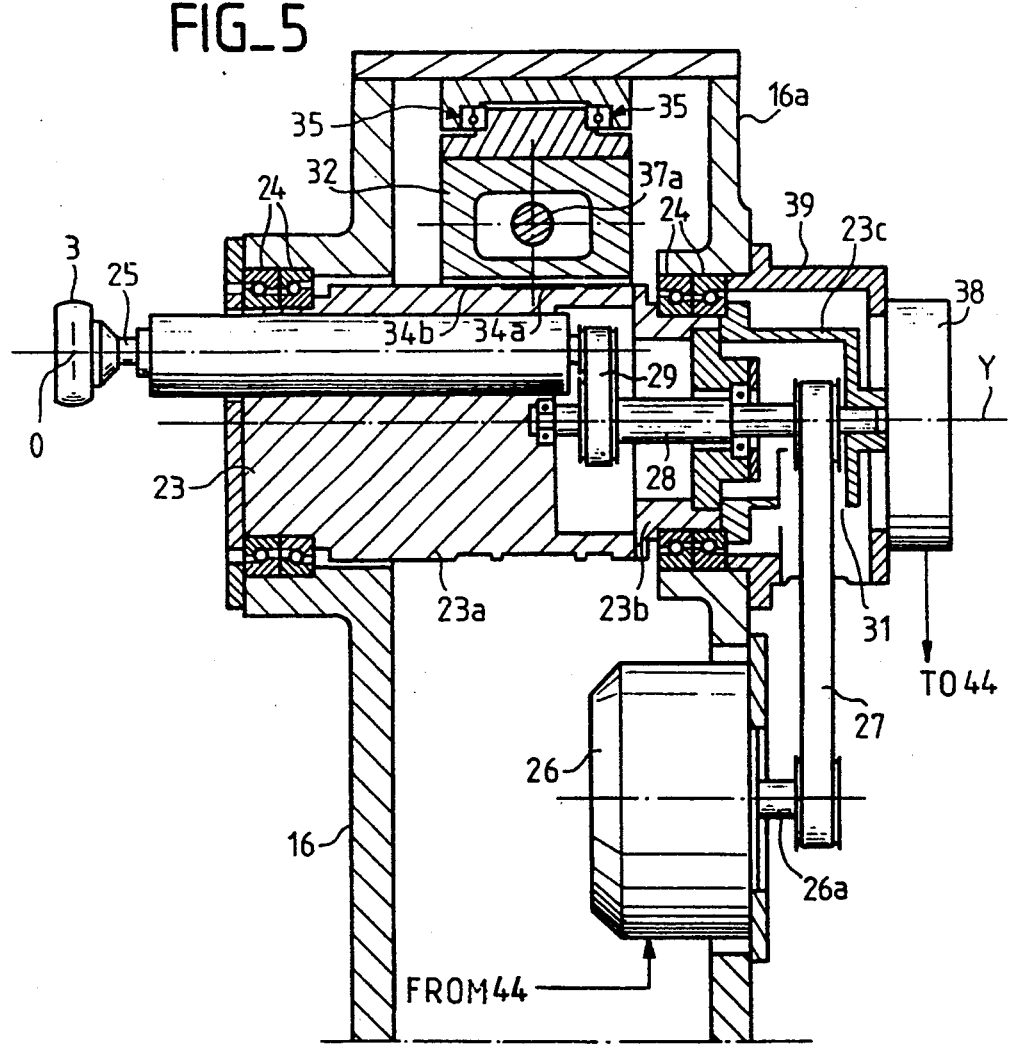
FIG_5
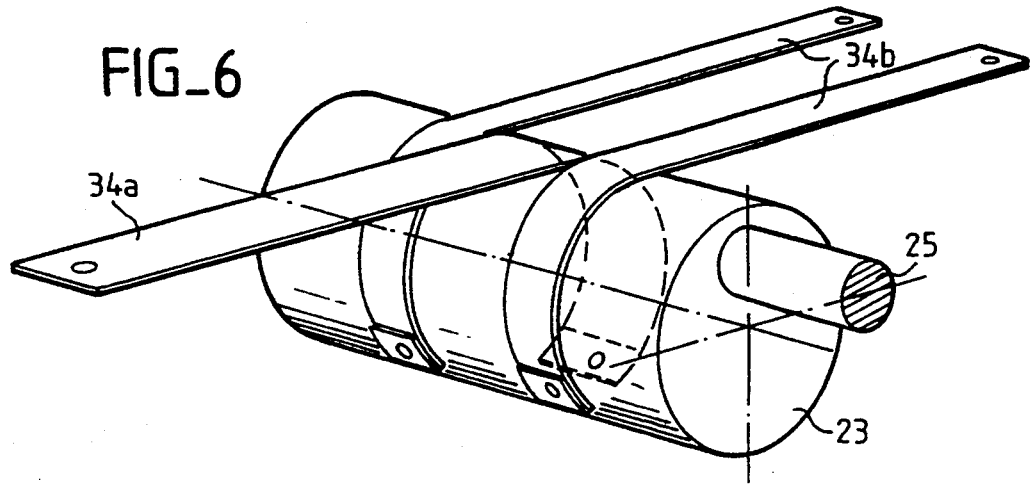
FIG_6

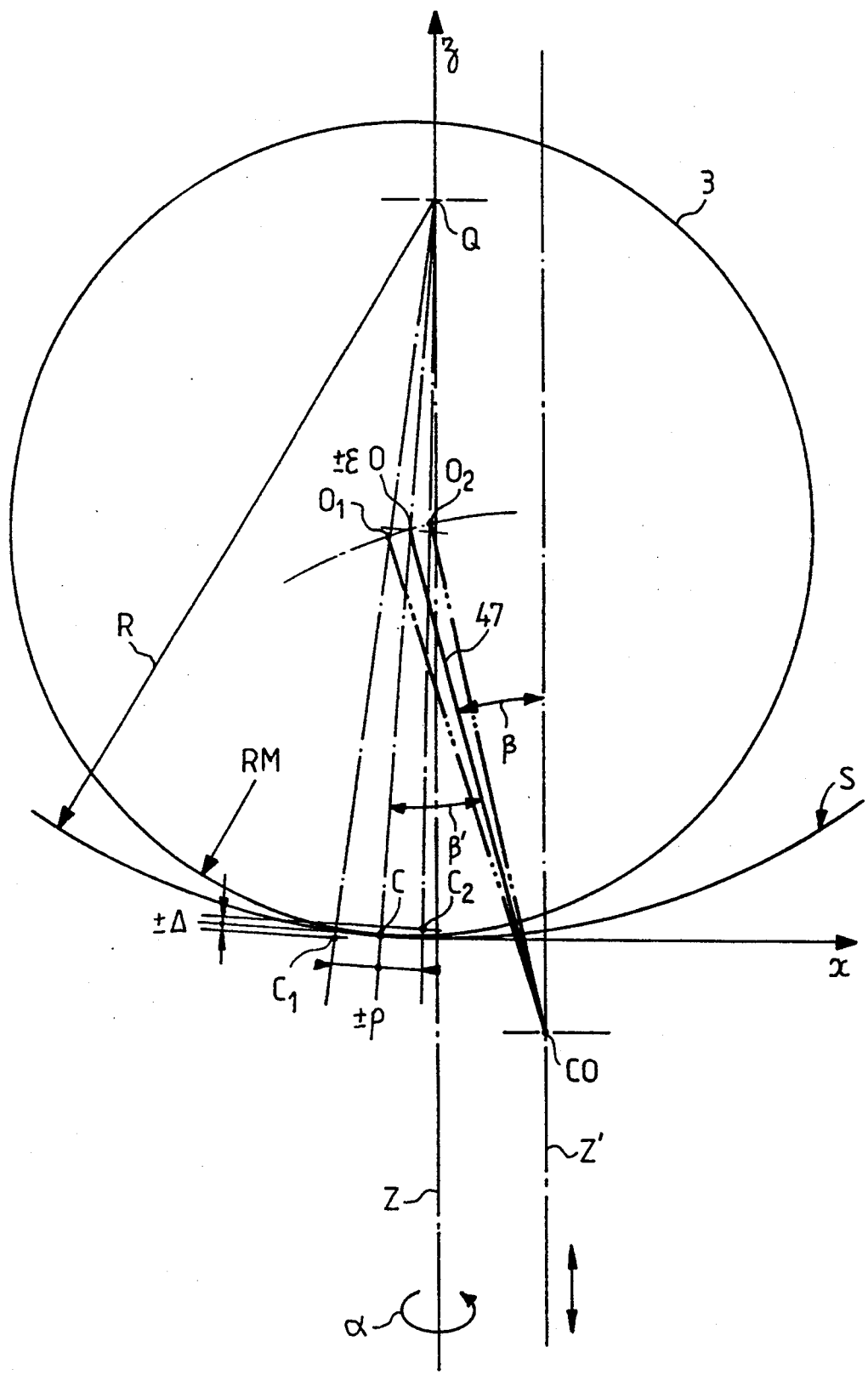
FIG_7

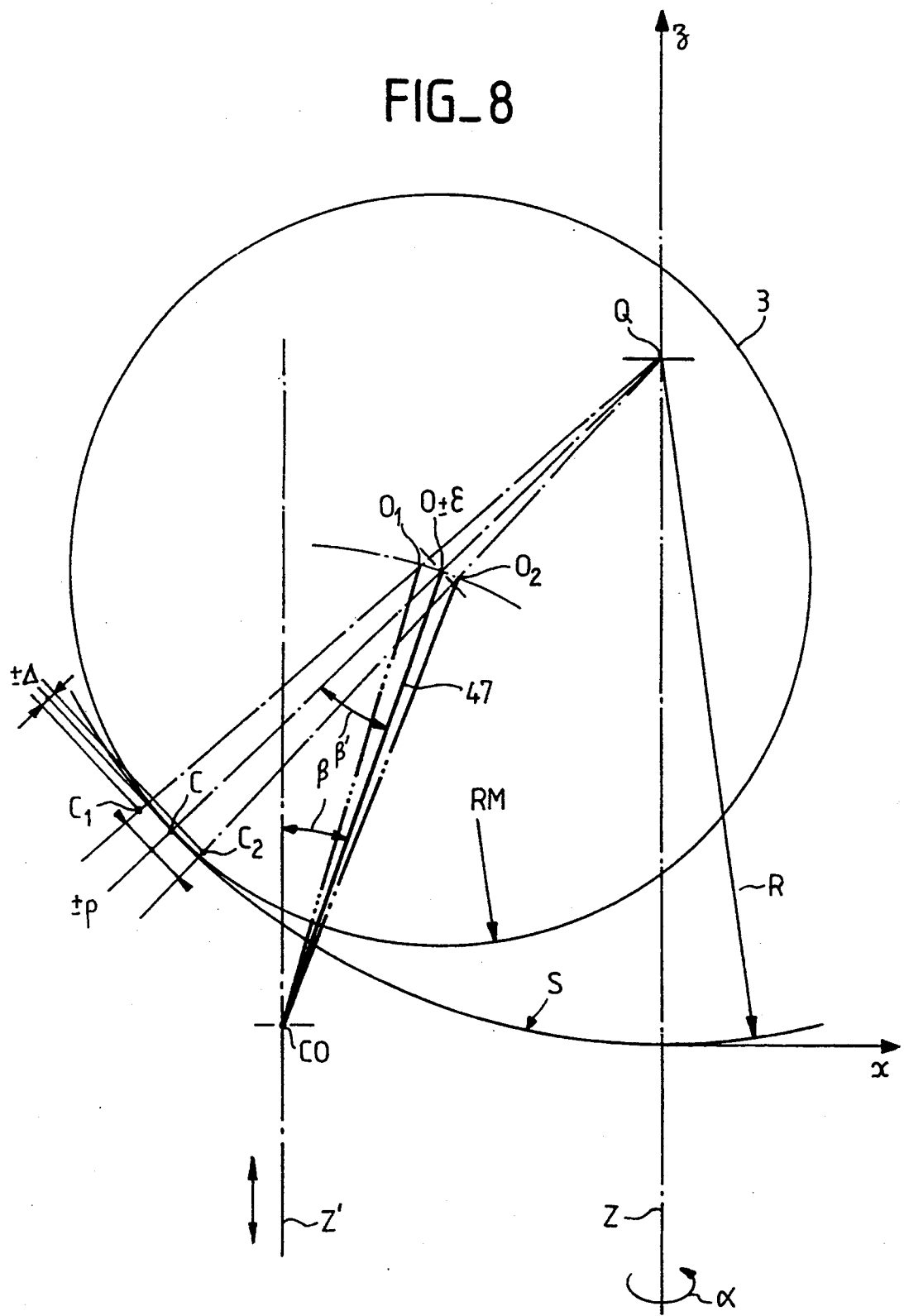

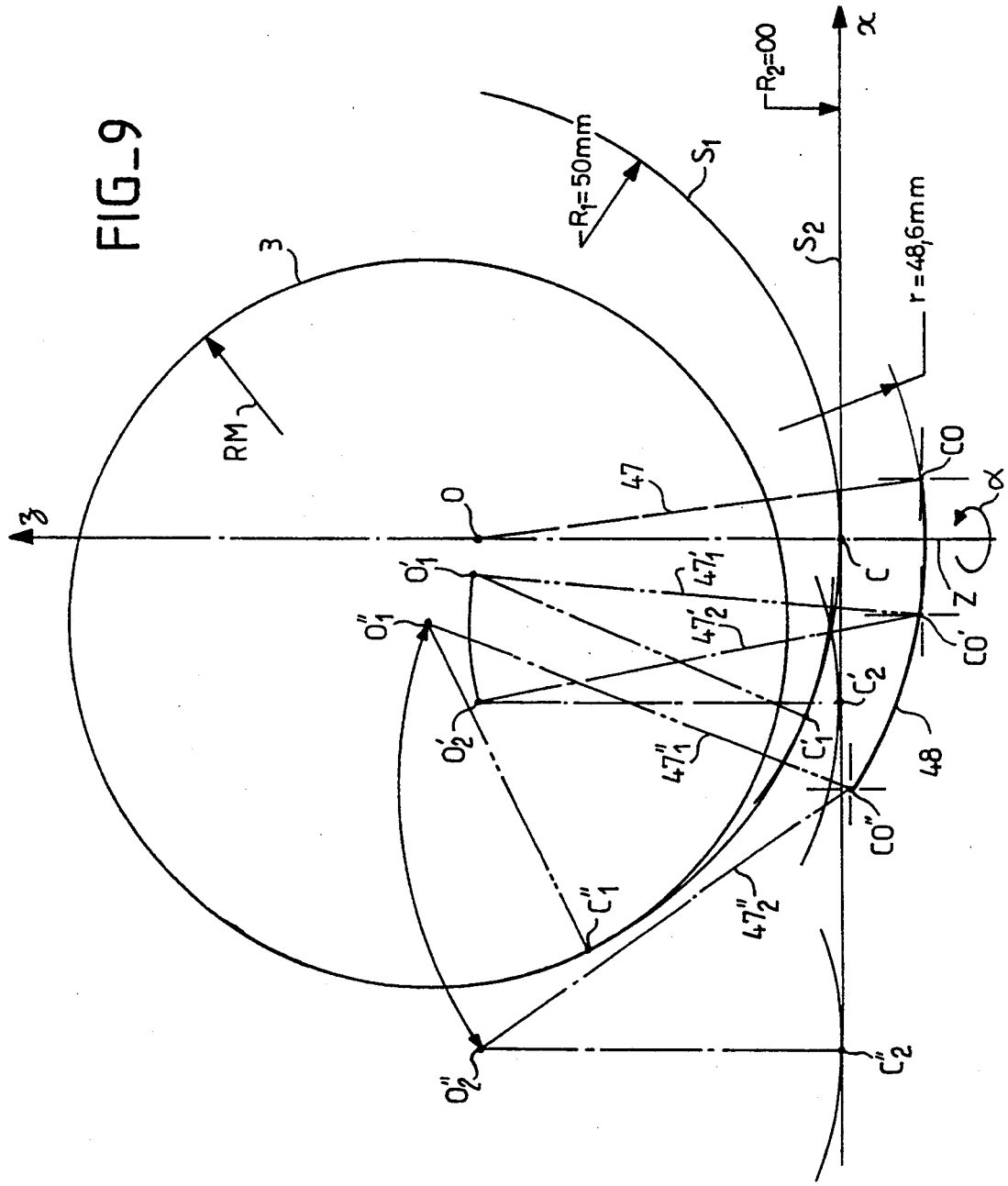

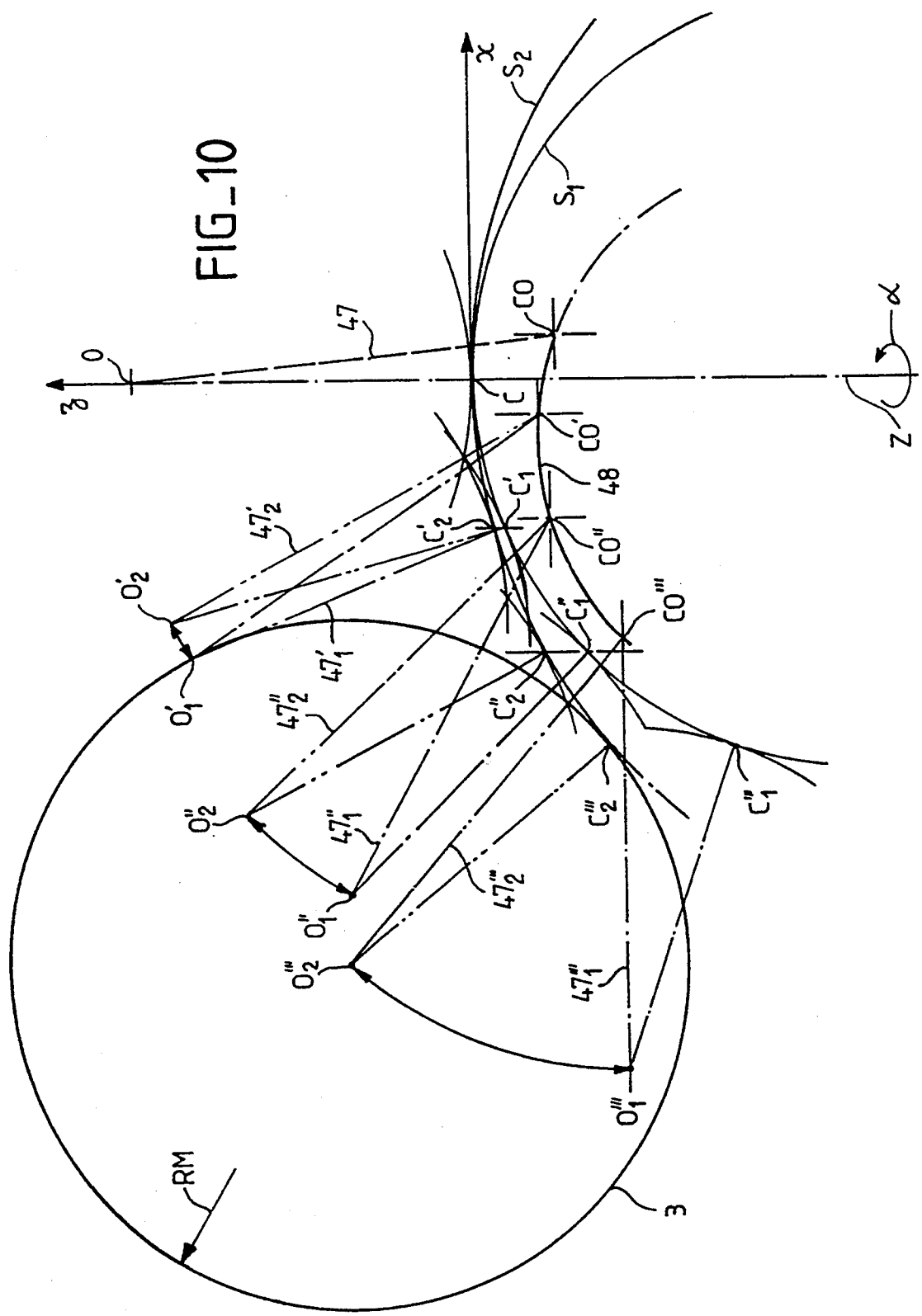

METHOD AND MULTI-AXIS NUMERICALLY-CONTROLLED MACHINE FOR MACHINING SURFACES

BACKGROUND OF THE INVENTION

1. Field of the Invention

This invention relates to a multi-axis numerically-controlled machine, which can be used to produce a surface of any shape whatsoever required and of finite extent on a workpiece, of the type comprising a workpiece holder to which a workpiece can be attached and which is rotatably mounted around a first geometrical axis, a first driving means connected to the workpiece holder for rotating it around the first geometrical axis, a rotating tool for machining a workpiece attached to the workpiece holder, said tool having an active surface which is a surface of revolution around an axis of rotation of the tool, a second driving means connected to the tool for rotating it around its axis of rotation, a first carriage which supports one of the two elements, i.e. the workpiece holder and the tool, and which is linearly movable along a second geometrical axis parallel to the first geometrical axis, a third driving means connected to the first carriage for displacing it along said second geometrical axis, a second carriage, which supports one of the two above-mentioned elements and is linearly movable along a third geometrical axis perpendicular to the first geometrical axis and secant with it, a fourth driving means connected to the second carriage for displacing it along said third geometrical axis, said surface of revolution of the tool having a center which is at all times contained in the plane defined by the first and third geometrical axes, control means connected to said first, third and fourth driving means for displacing the tool and the workpiece holder in relation to one another in response to data corresponding to a required surface to be produced on said workpiece. The invention also relates to a machining method using such a machine.

2. Description of the Prior Art

Machines of this type are already known (see European patent application No. 0,281,754, for instance). The machines of this type can notably be used for producing aspheric, concave or convex surfaces, e.g. surfaces referred to as "progressive surfaces" or variable power surfaces, either directly on an ophthalmic lens blank, or on a block of material suitable for subsequent use as sagging shape for the manufacture of an ophthalmic lens by thermal sagging, or even on a block of material suitable for subsequent use as a mold for the manufacture of an ophthalmic lens by molding of an organic material.

The known machine described in the above-mentioned European patent application is a three-axis machine, i.e. a machine in which, in addition to the rotating movement proper of the tool around its axis of rotation, there are three axes of relative movement between the tool and the workpiece holder or blank holder, namely a rotating movement of the workpiece holder around a first geometrical axis, a translational motion of the workpiece holder, borne by a first carriage, along a second geometrical axis parallel to the first geometrical axis, and a translational motion of the tool, borne by a second carriage, along a third geometrical axis perpendicular to and secant with the first geometrical axis. In this known machine, the three above-mentioned movements are used to achieve both the required spiral path on the surface of the workpiece and the depth of cut or thickness removed, i.e. the quantity of material that the tool must remove in sequence at points successively spaced along said spiral path. As a result, the carriage bearing the workpiece holder must perform an oscillating rectilinear movement, of which the amplitude of oscillation can reach relatively high values, notably in the case where the optical surface to be machined has radii of curvature with very different values in the equator plane and the main meridian plane of the surface to be machined, i.e. each time that by successive rotations of the workpiece holder through 90° around the first geometrical axis the point of contact between the tool and the surface to be machined moves from the equator plane to the main meridian plane, then back to the equator plane, and so forth. Such an operating mode is unfavorable from the point of view of machining precision, machining time and with regard to the freedom of choice of the machining path or other machining parameters. As regards machining precision and time, it should be noted that these two values are closely related. Indeed, the slower the displacement or oscillation speed of the tool or workpiece holder, the longer the machining time, but machining precision increases since the tracking errors generated by position-controlling devices (numerical control) associated with the various axes of movement are smaller.

OBJECT OF THE INVENTION

The main object of this invention is to remedy the preceding disadvantages, particularly to provide a machine of the above-mentioned type, enabling high machining precision to be obtained, with a short machining time, and providing greater freedom with regard to the choice of path of the tool in relation to the surface to be machined or with regard to the choice of other machining parameters.

SUMMARY OF THE INVENTION

Accordingly, the invention provides a machine characterized by further comprising a supporting element, which supports the tool and is rotationally movable around a fourth geometrical axis at right angles to the first and third geometrical axes, and a fifth driving means connected to said supporting element for rotating it around the fourth geometrical axis under the control of said control means.

According to an embodiment of this invention, the tool is preferably supported by said supporting element in such a way that the axis of rotation of the tool be parallel to the fourth geometrical axis. Preferably, the first carriage supports said supporting element and said second and fifth driving means, while the second carriage supports the workpiece holder and said first driving means.

Because of the fact that the tool is rotationally movable around a fourth geometrical axis, the three other movements around and along the first, second and third geometrical axes can be exclusively devoted to defining the path of the tool on the surface of the workpiece, while the rotating movement of the tool around the fourth geometrical axis can be devoted to achieving the depth of cut or thickness removed at each of the successive points of the path of the tool on the surface of the workpiece.

According to another aspect of this invention, the latter provides a machining method for producing a surface of any required shape whatsoever and of finite extent on a workpiece, by means of a multi-axis numerically-controlled machine comprising a rotating tool and a workpiece holder to which can be attached a workpiece, this method consisting in rotating the workpiece holder in step-by-step rotating movement around a first geometrical axis, and producing first and second relative rectilinear movements between the tool and the workpiece holder respectively along second and third geometrical axes, of which one is parallel and the other perpendicular to and secant with the first geometrical axis, said step-by-step rotating movement and said first and second rectilinear movements being control led in response to data corresponding to a required surface to be produced on said workpiece, characterized by further consisting in producing a relative movement of rotation between the tool and the workpiece holder around a fourth geometrical axis at right angles to the first and third geometrical axes, also in response to said data, using said step-by-step rotating movement and said first and second rectilinear movements solely for producing a spiral path of the tool on the surface of the workpiece, and using said relative movement of rotation around the fourth geometrical axis for achieving the required thickness removed at successive points of said spiral path.

It is therefore obvious that greater freedom of choice is available as regards the machining parameters (shape and pitch of the spiral path, etc.). Furthermore, by arranging for the plane containing the center of the tool and the fourth geometrical axis to remain approximately vertical (when the first geometrical axis is vertical) at least when the tool is in contact with the central area of the surface to be machined, it is then possible, as will be seen in detail hereinafter, to obtain a demultiplication or reduction effect of the tool movement in relation to the movement of the supporting element around the fourth geometrical axis, reduction effect which acts on the thickness removed and is thus particularly advantageous in improving the machining precision on the surface in the direction of its radii of curvature, and therefore, in the case of an ophthalmic lens, improving the quality of the correction of the optical power procured by the lens.

Moreover, due to the greater precision it provides, the reduction effect also enables a faster positioning control device to be used, thus enabling the amount of time required to machine a surface to be substantially reduced.

BRIEF DESCRIPTION OF THE DRAWINGS

Further features and advantages of the invention will be apparent from the following particular description of a preferred embodiment of this invention provided as an example as illustrated in the corresponding accompanying drawings in which:

FIG. 1 is a perspective view, partly in block diagram, showing a machine embodying the invention;

FIG. 2 is a partial front view and partial vertical sectional view of the machining center;

FIG. 3 is a sectional view along line III—III of FIG. 2;

FIG. 4 is a sectional view along line IV—IV of FIG. 3;

FIG. 5 is a sectional view along line V—V of FIG. 3, on a larger scale;

FIG. 6 is a view of the grinding wheel support.

FIGS. 7 and 8 are diagrams enabling the operation of the machine to be explained;

FIGS. 9 and 10 are diagrams showing two possible kinematics for the tool respectively in the case of a concave surface and in the case of a convex surface.

DESCRIPTION OF THE PREFERRED EMBODIMENTS

The invention will now be described with regard to a multi-axis numerically-controlled machine, more specifically intended for machining ophthalmic lens blanks. The machine 1 represented in FIGS. 1 to 5 comprises a frame 2, composed of e.g. a lower frame 2a and an upper frame 2b superimposed and attached to one another as shown in FIG. 2. On the frame 2 are mounted a rotating tool 3, comprised e.g. of a spherical grinding wheel, and a workpiece holder 4 of any known construction suitable for receiving and maintaining a workpiece, e.g. an ophthalmic lens blank 5. The workpiece holder 4 is coupled to a rotating spindle 6, of vertical axis Z, which is borne by a movable table or a carriage 7 and rotatably mounted on the latter. The lower end of the spindle 6 is coupled to a drive system comprising a DC motor 8 and a reducing gear 9 enabling a movement of rotation around axis Z to be transmitted to the spindle 6, and therefore to the blank 5. An angular position sensor 11 is associated with the spindle 6 for detecting the angular position of said spindle, and therefore that of the blank 5. The sensor 11 can be composed of a precision rotating encoder (9,000 scale marks) enabling an angular electronic resolution of 0.001 of a degree to be obtained as well as a maximum accuracy of the encoder of ±2.5 seconds of an arc (±0.0007 of a degree). The motor 8 and the reducing gear 9 are e.g. dimensioned such that the maximum speed of the spindle 6 is 135 rpm and that the mechanical play at output of the reducing gear 9 upon inversion of the direction of rotation is nil.

The table or carriage 7 is mounted on the upper frame 2b so as to be able to perform a translation along a horizontal axis X, which is perpendicular to and intersects the Z-axis. For this purpose, the carriage 7 is mounted on the upper frame 2b by means of two high-precision needle rails 12 (FIGS. 2 and 4). The carriage 7 can be displaced along the X-axis by means of a drive system comprising e.g. an electric motor 13 and a worm and nut gearing 14 transforming the rotating movement of the motor into a translational motion, the worm 14a of the gearing 14 being e.g. coupled to the output shaft 13a of the motor 13 and the nut 14b of said gearing being coupled to the carriage 7. The worm 14a can be e.g. a worm with satellite rollers and can have a pitch of 2 mm. The position of the carriage 7 along the X-axis, and therefore the position of the Z-axis in relation to a fixed vertical plane of the machine, which is perpendicular to the X-axis and which contains an axis Z' that will be defined hereinafter, can be detected by means of a linear position sensor 15, e.g. an incremental ruler with an electronic resolution of 0.1 μm. The precision of the ruler can then be ±2 μm. By integrating the measurement error curve into the electronic controls of the machine, the precision can be increased and a displacement control precision of ±1 μm can be attained. The motor 13 and the gearing 14 are e.g. dimensioned for the maximum displacement speed of the carriage 7 to be 3 m/min. and for the displacement stroke to be 150 mm.

The grinding wheel 5 is mounted on another movable table or carriage 18, in the form of a hollow caisson, which can be displaced in translation along a vertical geometrical axis Z' which is fixed with regard to the frame 2 of the machine. For this purpose, the carriage or caisson table 16 is mounted on the upper frame 2b and is vertically guided on the latter by two high-precision needle rails 17, similar to the rails 12 guiding the table or carriage 7. The carriage 16 can be displaced along the axis Z ' by another drive system comprising e.g. an electric motor 18 and a worm and nut gearing 19 similar to electric motor 13 and gearing 14. The motor 18 is attached to a beam 21 of the lower frame 2a and its output shaft 18a is coupled to the worm 19a of gearing 19, while the nut 19b of this gearing is coupled to the carriage 16 (FIGS. 2 and Like worm 14a, worm 19a can be comprised of a worm with satellite rollers and have a pitch of 2 mm. The motor 18 and gearing 19 are e.g. dimensioned for the maximum displacement speed of the carriage 16 to be 1.5 m/min. and for the vertical stroke of the carriage 16 to have an amplitude of 100 mm. The position of the carriage 16 along axis Z' can be detected by a linear position sensor 22 (FIG. 4). The sensor 22 can be similar to sensor 15 used in conjunction with carriage 7 and can have the same elect tonic resolution.

According to a feature of this invention, the grinding wheel 3 is borne by a supporting element 23, which is rotationally movable around a geometrical axis Y at right angles to the geometrical axes X and Z. The supporting element 23 can be e.g. comprised of a cylindrical barrel of axis merging with the Y-axis. The barrel 23 is rotatably mounted on the carriage 16 by means of a plurality of ball bearings 24 which also act as thrust bearings. The active surface of the grinding wheel 3 is e.g. in the shape of a spherical zone with a diameter of 80 mm and a width of 25 mm. The machine is designed so that the center O of the grinding wheel 3 remains at all times within the plane defined by axes X and Z throughout the movements of the carriage 16 along axis Z' and throughout the rotating movements of the cylindrical barrel 23 around the Y-axis. The grinding wheel 3 is attached to one of the ends of a spindle 25, of which the axis runs preferably parallel to the Y-axis and which is rotatably mounted in the cylindrical barrel 23. The axis of the spindle 25 is situated at a predetermined distance from the Y-axis of the cylindrical barrel 23.

The spindle 25 can be driven to rotate at a speed varying from e.g. 0 to 7,000 rpm by another drive system comprising an electric motor 26 attached to the carriage 16, a first endless belt transmission 27 kinematically connecting the output shaft 26a of motor 26 to an intermediate drive shaft 28 which is coaxial to the cylindrical barrel 23, and a second endless belt transmission 29, kinematically connecting the shaft 28 to the other end of the spindle 25, i.e. its end opposite the end bearing the grinding wheel 3, as shown in FIG. 5. To enable the intermediate shaft 28 and the belt transmission 29 to be installed into the cylindrical barrel 23, the latter is axially segmented into three parts 23a, 23b and 23c, as shown in FIG. 5, which are attached together by means not shown. On its peripheral surface, part 23c has a large opening 31 enabling the belt transmission to pass. In this respect, it should be noted that the barrel 23 never rotates through a complete revolution, only through limited oscillation movements around the Y-axis. Under these conditions, it is sufficient for the opening 31 to have an angular range slightly greater than the maximum oscillation amplitude of the barrel 23 around the Y-axis.

The cylindrical barrel can be turned around the geometrical axis Y by another drive system comprising e.g. a carriage 32 (FIGS. 3 and 5) which is translationally movable along a geometrical axis W at right angles to the geometrical axis Y, driving means 33 operatively connected to the carriage 32 for displacement along axis W, and at least two flexible but inextensible bands or metal foils 34a and 34b each having an end attached to the cylindrical barrel 23. As is more particularly visible in FIGS. 3 and 6, the band 34a winds in a first direction around part of the periphery of the cylindrical barrel 23 and has its other end attached to an end of the carriage 32, while the other band 34b winds in the opposite direction to the first direction around part of the periphery of the cylindrical barrel 23 and has its other end attached to the other end of the carriage 32. For the purposes of balancing the points of application of the forces applied to the cylindrical barrel 23 by the bands 34a and 34b, one of the two bands, e.g. band 34b, is preferably subdivided into two parallel bands each of width equal to half that of band 34a and disposed respectively on both sides of the latter as shown in FIG. 6.

The carriage 32 is movable inside the caisson carriage 16 in a widened upper part 16a of the latter, by means of two high-precision needle rails 35 running parallel to the W-axis, which in this instance is horizontal and parallel to the X-axis, but which could be oriented any other way perpendicular to the Y-axis. As is more particularly visible in FIG. 3, the driving means 33 can comprise e.g. an electric motor 36 and a worm and nut gearing 37 transforming the rotating movement of the motor 36 into a translational movement for the carriage 32. The worm 37a of the gearing 37 is coupled to the output shaft 36a of motor 36, while the nut 37b of the gearing 37 is fixed to the carriage 32. The worm 37a can be a worm like worms 14a and 19a described above. The motor 36 and the gearing 37 are e.g. dimensioned for the barrel 23 to rotate at a maximum speed of approximately 6.4 rpm, with a speed reducing ratio of 1/314. With such a drive system, the cylindrical barrel 23 can be rotated at will in either direction around the Y-axis by having the motor turn in either direction. Such a drive system may seem relatively complex. However, it has the advantage of providing transmission devoid of play between the cylindrical barrel 23 and the carriage 32 each time the direction of displacement of the latter is reversed, thus the possibility of obtaining a precise angular position for the cylindrical barrel 23.

An angular position sensor 38 is provided for detecting the angular position of the barrel 23, and therefore the angular position of the center O of the grinding wheel 3 on a circle centered on the Y-axis. As shown in FIG. 5, the sensor 38 can be e.g. operatively connected to the part 25c of the cylindrical barrel 23 which projects over the end of the caisson carriage 16 via an opening at the rear of the latter, and can be supported by a protective casing 39 which is itself attached to the carriage 16 and which partially hides the belt transmission 27. The sensor 38 can be e.g. composed of a high-precision rotating encoder (36,000 scale marks) with an angular electronic resolution of 0.0001 of a degree, providing a maximum precision of ±0.00027 of a degree (±1 second of an arc).

In view of the fact that during machining the point of contact between the spherical face of the grinding wheel 3 and the surface of the blank 5 to be machined will generally move about on the surface of the grinding wheel, without remaining constantly on the same circle of this surface, the wearing of the grinding wheel cannot be mastered. To obviate this, the machine of the invention can advantageously comprise a regeneration system for the grinding wheel 3. This regeneration system, only shown in FIG. 2, can be e.g. comprised of a cup wheel 41 which can be rotationally driven by an electric motor 42. The motor 42 can be e.g. borne by the protective casing 43 that usually surrounds the grinding wheel 3 and the workpiece holder 4 and which is also usually used as a collecting tank for the cooling liquid projected onto the grinding wheel 3 and the blank 5 during machining. The cup wheel 41 can e.g. have an inside diameter of 38 mm when the grinding wheel 3 has a diameter of 80 mm. Every time the grinding wheel 3 must be regenerated, the motor 42 is started up and the grinding wheel 3 is brought into contact with the cup wheel 41 by means of the carriage 16 and the drive system 18, 19 associated with it.

The various active elements of the machine of this invention, such as e.g. the motors 8, 13, 18, 26, 36 and 42, are controlled by a computer schematically represented in FIG. 1 in the form of a block 44. In addition to its outputs towards the above-mentioned active elements, the computer 44 can comprise at least one other output 45 for controlling other elements of the machine or associated with it, such as e.g. a device for projecting the above-mentioned cooling liquid, a transfer device (not shown) for feeding in and positioning a blank on the workpiece holder 4 and evacuating it once the machining of the blank is completed, possibly a maintenance device (not shown) for actively maintaining the blank 5 in the workpiece holder 4 during the blank machining operation, a possible ejecting device (not shown) for facilitating extraction of the blank 5 from the workpiece holder 4 once the machining of the blank has been completed, etc., or else an output connected to a display device for the display of data or messages.

The computer 44 receives the information coming from the various sensors 11, 15, 22 and 38 described above. The computer 44 further comprises at least one other input 46 for receiving other information such as e.g. information coming in from end-of-travel detectors or limit switchers, as is usually provided in this type of machine, information coming in from a keyboard (not shown) by means of which an operator can key in data into the computer 44, information coming in from a telematic line enabling the computer 44 to receive instructions/or exchange data with remote sites.

With the machine of the invention described hereinabove, every point on the surface required on the blank 5 can be defined by three coordinates in a system of three coordinate axes x, y and z, which is fixed in relation to the blank 5, as in the above-mentioned European patent application No. 0,281,754. This fixed coordinate system is usually defined by cooperating complementary elements provided respectively in the workpiece holder 4 and on an mounting block fixed to the blank 5 and received in the workpiece holder 4. The axes x, y and z can be e.g. parallel or merged with the axes X, Y and Z described above. Conversely, with the machine of this invention, the three coordinates of each point of the required surface can be transformed to four coordinates for the center O of the grinding wheel 3. These four coordinates are the two coordinates X and Z measured along the two axes X and Z, the coordinate $\alpha$ (angle of rotation around the Z-axis) and the coordinate $\beta$ (angle of rotation around the Y-axis). The first three above-mentioned coordinates X, Z and $\alpha$ define the position of the instantaneous center of rotation or center of oscillation CO of the grinding wheel 3 in relation to the surface of the blank 5. This point CO is situated at the intersection of the Y-axis and the vertical plane defined by the axes X and Z and which also contains the center O of the grinding wheel 3. The position of this point CO can be controlled by means of the position data provided by the sensors 11, 15 and 22 described above. The coordinate $\beta$ enables the position of the center O of the grinding wheel 3 to be defined, and therefore the position of the point of contact C (see FIGS. 7 and 8) between the grinding wheel 3 and the surface S of the blank to be machined. In this way, knowing the four coordinates X, Z, $\alpha$ and $\beta$ and knowing the radius RM of the grinding wheel 3 (this radius is a design datum, e.g. 40 mm in the example described above, or can be measured after each regeneration of the grinding wheel 3) and the length of the segment 47 joining the points O and CO (this length is also a design datum and is equal to the distance between the Y-axis of the cylindrical barrel 23 and the geometrical axis of the spindle 25), it is then possible to define the position of the point of contact C between the grinding wheel 3 and the surface S of the blank to be machined, and therefore to define any point of the required surface to be machined with the grinding wheel 3.

The design of the machine of the invention with four axes (translations along axes X and Z, rotation $\alpha$ around the Z-axis and rotation $\beta$ around the Y-axis) enables skewed (aspheric), concave or convex surfaces to be produced. Utilization of these four axes has the advantage of totally mastering the path of the grinding wheel 3 on the surface of the workpiece. Different spirals can thus be obtained depending on the machining laws imposed at the outset. For instance, any of the following can be imposed on the spiral path:
- a constant pitch in terms of arc value on the equator and meridian of a toroid;
- a constant pitch in terms of projection on the equator and meridian of a toroid;
- a constant spiral groove depth on the equator and meridian;
- meridian and equator completed at the same time at the edge of the lens;
- meridian completed before the equator at the edge of the lens;
- equator completed before the meridian at the edge of the lens; etc.

Depending on the machining law selected at the outset, the resulting kinematics for points O and CO leads to an orientation of segment 47 conducive to machining precision as will now be explained in reference to FIGS. 7 and 8 in the case of a concave surface S. In FIGS. 7 and 8, R designates the radius of curvature of the surface S worked upon, of which the center Q is aligned with the center O of the grinding wheel 3 and with the point of contact C between the latter and the surface S. $\pm\epsilon$ designates the arc error due to the sum of the mechanical error (rigidity) and the numerical control tracking error in relation to the rotating movements $\beta$ around the Y-axis (rotation of the center O of the grinding wheel 3 around the instantaneous center of rotation CO). This error $\pm\epsilon$ entails, for each calculated position of O corresponding to a point of the required surface, a position O error range represented by the arc $\widehat{O_1OO_2}$ in FIGS. 7 and 8. $\beta$ designates the angle between the vertical axis Z' and the segment 47 joining points O and CO (segment 47 will be referred to hereinafter as oscillation rod; this oscillation rod extends perpendicular to the Y-axis and can oscillate around this axis). $\beta'$ designates the angle between the oscillation rod 47 and the straight line joining points Q, O and C. Point C should normally be machined with the grinding wheel 3 centered at O. Imprecise positioning from O to $\pm \epsilon$ causes an error of generation of point C, of which the limits are indicated in $C_1$ and $C_2$. This generation error entails an error $\pm \Delta$ in the generation of the radius of curvature at the point worked on on the required surface, and an error $\pm \rho$ along axis x. Recording to FIG. 7, it can be seen that when the angles $\beta$ and $\beta'$ have a relatively low value, i.e. when the oscillation rod 47 is oriented near the vertical and when the point C worked upon is situated in the central region of the surface S, the error $\pm \Delta$ is smaller than the error $\pm \epsilon$. The rod 47 procures a reducing effect in a ratio corresponding to the reciprocal of the ratio of the length of an arc of a circle to the length of the arrow of that arc. If $\beta' \leq 20°$, it can be shown that $\pm \Delta \leq 0.5$ $\mu$m. In this respect, it should be noted that the lengths of the arcs $\overset{\frown}{O_1OO_2}$ and $\overset{\frown}{C_1CC_2}$ in FIGS. 7 and 8 have been highly exaggerated for the purposes of the description in order to make the above-mentioned reducing effect more visible. The error $\pm \rho$ generated along axis x results in a pitch error on the spiral path of the grinding wheel 3 on surface S. This pitch error is negligible (the incidence of $\pm \rho$ on the position of point C is a function of the value of the radius R worked and is in the order of $\pm 0.1$ $\mu$m). By comparing FIGS. 7 and 8, the angle $\beta'$ can be seen to increase when point C moves away from the center of the surface S, i.e. when it gets nearer the edge of said surface. Depending on the kinematics used and the radiuses R worked, $\beta'$ can vary from 30° to 90° for a diameter of 100 mm, and it can be shown that under these conditions $\pm \Delta$ will vary from $\pm 0.75$ $\mu$m to $\pm 2.1$ $\mu$m depending on the value of $\beta'$. It should be noted that the error in the production of the pitch of the spiral path in the region of the edge of the surface S will decrease in relation to the error in the region of the center of said surface, since the value of the angle $\beta'$ increases.

In this way, the original design of the machine of this invention with the oscillation rod 47 for the grinding wheel 3 (rotation $\beta$ around the geometrical axis Y) and the resultant reducing effect, enable, depending on the positions of the instantaneous centers of rotation CO, best optimization of the paths required on the surface to be machined and of the machining precisions relating to ophthalmic optics. For instance, it is possible to obtain a precision that is maximal at the optic center of the surface and which gradually decreases towards the edge of the latter. Kinematics can also be envisaged such that the angle $\beta'$ always remains below 20° from the center of the surface to its edge, which enables the same precision to be maintained over the entire surface.

FIGS. 9 and 10 illustrate two possible examples of kinematics for the instantaneous center of rotation CO and for the center O of the grinding wheel 3, respectively for a concave surface and for a convex surface. In FIGS. 9 and 10, reference number 48 designates the path of the instantaneous center of rotation CO when the point of contact C between the grinding wheel 3 and the surface to be machined moves from the center of said surface to its edge or vice versa. S1 and S2 respectively designate the meridian and the equator of the surface, i.e. two sections of the surface by perpendicular planes containing the axis Z (or z). 47 again designates the oscillation rod, i.e. the segment joining points O and CO. The signs dash ('), double dash (") and triple dash ("') have been attributed to the reference symbols CO, O, C and 47 to designate the successive different positions of the corresponding elements. Indices 1 and 2 have also been attributed to the above-mentioned reference symbols in order to distinguish the positions of the corresponding elements respectively associated with the meridian S1 and the equator S2 of the surface. For instance, when the instantaneous center of rotation occupies the position designated by CO' on the curve 48, the oscillation rod, the center of the grinding wheel 3 and the point of contact between the grinding wheel and the surface respectively occupy the positions designated by $47'_1$, $O'_1$ and $C'_1$ for the meridian $S_1$, and the positions $47'_2$, $O'_2$ and $C'_2$ for the equator $S_2$. FIG. 9 corresponds to the case where a machining law is imposed such that the spiral path has a constant arc pitch for equator and meridian, in the case of a concave surface of which the equator $S_2$ has a radius $R_2$ of infinite value and a meridian $S_1$ of radius $R_1$ equal to 50 mm. FIG. 10 corresponds to the case where a machining law is imposed such that the equator and the meridian of the surface are completed at the same time, for a 7.5 base lens, with an addition of 3.5 and a diameter of 85 mm, the meridian $S_1$ and the equator $S_2$ respectively having a radius $R_1$ of 45 mm and a radius $R_2$ of 67 mm, It goes without saying that the embodiment of the invention described above has been provided as a purely indicative and non-restricting example, and that numerous modifications can be easily made by those skilled in the art without departing from the scope of the invention. It is thus notably the case that, instead of displacing the workpiece holder 4 along the X-axis and the tool 3 along the Z-axis (or Z'), the tool can of course be displaced along the X-axis and the workpiece holder 4 along the Z-axis. It is also possible to solely endow the tool 3 with a movement of rotation $\beta$ around the Y-axis and to endow the workpiece holder 4 with the three other movements, namely the translational movements along axes X and Z and the rotation $\alpha$ around axis Z. Or again, it is possible to solely endow the workpiece holder 4 with the rotation $\alpha$ around axis Z and to endow the tool 3, in addition to its own movement of rotation, with the three other movements, namely the translational movements along axes X and Z and the rotation $\beta$ around axis Y. Moreover, though the invention has been more particularly described in relation to a machine for an ophthalmic lens blank 5, by using a suitable grinding wheel and suitable workpiece holder, the machine of the invention can also be used to machine a block of material intended for subsequent use as sagging shape for the manufacture of ophthalmic lens by thermal sagging, or as a mold for the manufacture of an ophthalmic lens in a polymerizable organic material. Furthermore, the machine of the invention can also be used, subject to an adaptation of the tool 3, as a clear-polishing or polishing machine for aspheric surfaces. Finally, though in foregoing description the axis of rotation of the tool 3, i.e. the axis of the spindle 25, is parallel to the Y-axis as is clearly visible in FIGS. 2 and 5, it could be at right angles to the Y-axis.

I claim:

1. A multi-axis numerically-controlled machine, which can be used to produce a required surface of any shape whatsoever and of finite extent on a workpiece, comprising a workpiece holder to which a workpiece can be attached and which is rotatably mounted around a first geometrical axis having a fixed direction, a first driving means connected to the workpiece holder for rotating it around said first geometrical axis, a rotating tool for machining a workpiece attached to said workpiece holder, said tool having an active surface which is a surface of revolution around an axis of rotation of said tool, a second driving means connected to said tool for rotating it around its axis of rotation, a first carriage which supports one of said workpiece holder and said tool, and which is linearly movable along a second fixed geometrical axis parallel to said first geometrical axis, a third driving means connected to said first carriage for displacing it along said second fixed geometrical axis, a second carriage, which supports one of said workpiece holder and said tool and is linearly movable along a third fixed geometrical axis perpendicular to said first geometrical axis and secant with it, a fourth driving means connected to said second carriage for displacing it along said third fixed geometrical axis, said surface of revolution of said tool having a center which is at all times contained in a fixed plane defined by said first and third geometrical axes, a control means connected to said first, third and fourth driving means for displacing said tool and said workpiece holder in relation to one another in response to data corresponding to a required surface to be produced on said workpiece, and a supporting element, which supports said tool and is rotationally movable around a fourth geometrical axis having a fixed direction at right angles to said first and third geometrical axes, and a fifth driving means connected to said supporting element for rotating it around said fourth geometrical axis under the control of said control means, wherein said supporting element defines an oscillation rod extending perpendicular to said fourth geometrical axis and having a predetermined length measured between said center of said surface of revolution of said tool and said fourth axis, whereby oscillating movement of said oscillation rod can be used for the removal of a thickness during machining of the surface.

2. The machine as claimed in claim 1, wherein said tool is borne by said supporting element in such a way that the axis of rotation of said tool is parallel to said fourth geometrical axis.

3. The machine as claimed in claim 1, wherein said first carriage supports said supporting element and said second and fifth driving means.

4. The machine as claimed in claim 3, wherein said supporting element is comprised of a cylindrical barrel having an axis merging with said fourth geometrical axis and which is rotationally mounted on said first carriage around said fourth geometrical axis, and wherein said tool is comprised of a spherical grinding wheel, which is attached to one of the ends of a spindle of axis parallel to said fourth geometrical axis, and which is rotationally mounted in said cylindrical barrel, the axis of said spindle being situated at a predetermined distance from said axis of said cylindrical barrel.

5. The machine as claimed in claim 4, wherein said second driving means comprises a motor attached to said first carriage, a first endless belt transmission mounted between the output shaft of said motor and an intermediate drive shaft that is coaxial with said cylindrical barrel, and a second endless belt transmission mounted between said intermediate shaft and the other end of said spindle.

6. The machine as claimed in either claim 4 or 5, wherein said fifth driving means comprises a third carriage which is mounted linearly movable in relation to said first carriage in a direction at right angles to said fourth geometrical axis, a driving means operatively connected to said third carriage for displacing it along said direction at right angles, and at least two flexible but inextensible bands each having one end attached to the cylindrical barrel, a first one of said bands winding in a first direction around part of the periphery of said cylindrical barrel and having its other end attached to an end of said third carriage, while the other band winds in the opposite direction to said first direction around part of the periphery of said cylindrical barrel and has its other end attached to the other end of said third carriage.

7. The machine as claimed in claim 4, further comprising an angular position sensor, which is borne by said first carriage and is operatively coupled to said cylindrical barrel for detecting the angular position of said barrel.

8. The machine as claimed in claim 1, wherein said second carriage supports said workpiece holder and said first driving means.

9. A machining method for producing a required surface of any shape whatsoever and of finite extent on a workpiece, by means of a multi-axis numerically-controlled machine comprising a rotating tool and a workpiece holder to which can be attached a workpiece to be machined, this method consisting in rotating said workpiece holder in step-by-step rotating movement around a first geometrical axis having a fixed direction, producing first and second relative rectilinear movements between said tool and said workpiece holder respectively along second and third fixed geometrical axes, of which one is parallel and the other perpendicular to and secant with said first geometrical axis, producing a relative movement of rotation between said tool and said workpiece holder around a fourth geometrical axis having a fixed direction at right angles to said first and third geometrical axes, controlling said step-by-step rotating movement, said first and second rectilinear movements and said relative movement of rotation between said tool and said workpiece holder in response to data corresponding to a required surface to be produced on said workpiece, using said step-by-step rotating movement and said first and second rectilinear movements solely for producing a spiral path of said tool on the surface of the workpiece to be machined, and using said relative movement of rotation around said fourth geometrical axis for achieving the required thickness removed at successive points of said spiral path.

* * * * *